United States Patent Office 3,134,664
Patented May 26, 1964

3,134,664
PASTE FORMULATIONS OF ALKALI METAL SALTS OF HALOARYLOXYALKYLCARBOXYLIC ACIDS
David Edward Baum, East Bentleigh, Victoria, and Fergus Eugene Farrow, Kensington, Victoria, Australia, assignors to Monsanto Chemicals (Australia) Limited, West Footscray, Victoria, Australia, a company of Victoria
No Drawing. Filed May 25, 1960, Ser. No. 31,514
Claims priority, application Australia May 27, 1959
5 Claims. (Cl. 71—2.6)

This invention provides paste formulations of the alkali metal salts, i.e., the sodium or potassium salts, of the herbicidal haloaryloxyalkylcarboxylic acids, in particular those alkali metal salts of the herbicidal chloro phenoxy aliphatic acid series, especially the sodium salt of 2,4-dichlorophenoxyacetic acid or the sodium salt of 2-methyl-4-chlorophenoxy acetic acid or the sodium salt of 2,4-dichlorophenoxybutyric acid or the sodium salt of 2,4,5-trichlorophenoxyacetic acid, which form a slurry of the salt in the course of preparing the salt in a reactor vessel, or, form a solution of the salt which can be readily concentrated or otherwise converted into slurry form as hereinafter indicated, the paste formulations of the invention being readily dispersible in water for dilution and application as a herbicide.

2,4-dichlorophenoxyacetic acid, its salts, and its esters are used extensively as herbicides. They are particularly useful for the control or eradication of broad leafed types of weeds. Where water-soluble preparations are required, the sodium or amine salts are used. The usual method of preparation of the sodium salt is by reacting together in solution, in a reactor vessel, sodium monochloracetate and technical sodium 2,4-dichlorophenate, the latter material containing some 2,6-isomer. Under appropriate conditions of temperature and pH, these materials from sodium 2,4-dichlorophenoxy acetate and sodium chloride. The product formed in the reactor vessel from this reaction consists of an alkaline suspension or slurry of sodium 2,4-dichlorophenoxyacetate, together with varying amounts of dissolved sodium chlorophenates, sodium chloride and sodium 2,6-dichlorophenoxyacetate. The relative proportions of all these end-product materials in the reactor slurry depends on the purity of the reactants used and the amounts and concentration of reactants charged to the reactor vessel. The sodium 2,4-dichlorophenoxyacetate is separated by filtration, washed free of adsorbed impurities and dried, for use as a water-soluble powder. The purified sodium 2,4-dichlorophenoxyacetate can also be treated with mineral acid to obtain the 2,4-dichlorophenoxyacetic acid. This acid may then be treated with an amine solution to give the amine salt of the 2,4-dichlorophenoxyacetic acid. Amine salts are normally formulated as concentrated aqueous solutions which are diluted with water as required by the user.

The recovery and subsequent treatment of sodium 2,4-dichlorophenoxyacetate to prepare water-soluble formulations of this kind adds considerably to the cost of the active component, calculated as 2,4-dichlorophenoxyacetic acid, in the formulation, and it would be an advantage to be able to formulate the sodium 2,4-dichlorophenoxyacetate in the reactor slurry without any further treatment.

We have concluded that the most satisfactory type of formulation for this slurry would be a paste, as compositions of that kind avoid drying or chemical treatment of the slurry. For example, a powder formulation will require filtration and drying of the solids, whilst a liquid formulation (emulsifiable concentrate or solution concentrate) will require chemical treatment to convert the sodium 2,4-dichlorophenoxyacetate into a more water-soluble form. On the other hand, a paste formulation of the sodium 2,4-dichlorophenoxyacetate prepared from the reactor slurry would not require drying or other chemical treatment.

We have appreciated, however, that a paste formulation of sodium 2,4-dichlorophenoxyacetate may have disadvantages in that (a) the sodium 2,4-dichlorophenoxyacetate which is water-soluble, is dispersed in an aqueous medium, which may cause the paste to be unstable on standing due to changes in crystal size; (b) pastes generally require milling during manufacture; (c) sodium 2,4-dichlorophenoxyacetate can precipitate in hard water, which problem is common to all water-soluble formulations of 2,4-dichlorophenoxyacetic acid derivatives; and (d) pastes tend to settle out, forming a hard cake which cannot be readily redispersed.

The same general position obtains with respect to those of the other related alkali metal salts of the herbicidal haloaryloxyalkylcarboxylic acid series which form a slurry of the salt in the reactor vessel, or, form a solution of the salt which can be readily converted to a slurry, an example of the latter material being the sodium salt of 2-methyl-4-chlorophenoxyacetic acid.

According to the present invention there is provided a paste formulation of an alkali metal salt of the herbicidal haloaryloxyalkylcarboxylic acid series of the kind indicated herein, comprising an aqueous slurry of said salt mixed with an oil and a surface active agent in concentration and amounts to form a paste consisting of a suspension of oil-coated crystals of said salt in the aqueous medium.

The compositions of the invention are conveniently prepared by the method which comprises adding an oil and a surface active agent to a slurry of the salt obtained direct from the reactor vessel in which the salt was prepared, or, adding an oil and a surface active agent to a slurry of the salt obtained by concentrating a solution of the salt direct from the reactor vessel in which the salt was prepared, and thoroughly mixing until these components are blended into a paste.

In preparing paste formulations from slurries which have been obtained direct from the reactor vessel, for example, a slurry of the sodium salt of 2,4-dichlorophenoxyacetic acid, the preferred practice is first to concentrate the reactor slurry by removal of excess mother liquor. This may be done by setling, filtration, or other mechanical means. The content of the herbicidal salt component in the concentrated slurry should be sufficient to give the required final concentration of such salt after formulation. For example, a slurry containing at least 55% w./w. 2,4-dichlorophenoxyacetic acid (as the sodium salt) is required for a paste which will contain 50% w./w. of such acid. The final paste should contain from 40% to 80% by weight of 2,4-dichlorophenoxyacetic acid based on the final weight of the paste, the preferred concentration being 50% to 60% by weight.

The paste components are not required to be mixed in any definite order, but all components should be thoroughly blended together. The final product is a slightly thixotropic paste having a specific gravity of about 1.3. The viscosity as measured on a Brookfield Viscometer using a No. 4 spindle is approximately 30,000 centipoise at 6 r.p.m., and 17,000 centipoise at 12 r.p.m. Other materials may be added to the formulation, for example, fillers such as cane sugar or bentonite, and co-weting agents such as non-ionic emulsifiers to improve the water-dispersibility of the paste.

Persons concerned with the art will appreciate that preparation of pastes of herbicidal salts of the kind specified herein directly from the reactor slurry is itself a substantial advantage, also the stability of the paste is assured by coating the particular herbicidal salt with the oil, which, in being water insoluble prevents contact between the water and the herbicidal salt, thus maintaining the existing crystal size and causing the particles of the herbicidal salt to flocculate, which prevents settling of the particles as referred to above. The presence of the small amount of surface active agent enables the herbicidal salt to be preferentially coated with the oil whilst in aqueous suspension, as indicated.

In this specification, the term "oil" means an organic liquid not miscible with water and having no solvent action on the herbicidal salt, whilst the term "surface active agent" means a material which will enable the herbicidal salt to be apparently preferentially wetted by the oil, rather than by the water, so that the herbicidal salt is rendered hydrophobic. The amount of oil in the paste may be from 5% to 10% by weight based on the total weight of the paste, the preferred amount being 8% to 9% by weight, whilst the amount of surface active agent in the paste may be from 1% to 2% by weight based on the total weight of the paste. The oil used may be any petroleum fraction, lighting kerosene being preferred, however, coal tar oils, such as solvent naphtha, may also be employed.

Of the surface active agents which may be used, cationic wetting agents have been found most effective. The preferred types are those known as the "Arquads," which are technical forms of quaternary ammonium chlorides made by Armour & Co. Inc., of Newark, N.J., U.S.A. Other useful cationic wetting agents which have been used are those identified by the term "lissolamine" (a technical grade of cetyl trimethyl ammonium bromide) and the term "Fixanol C" (a technical grade of cetyl trimethyl pyridinium bromide); and cetyl dimethyl benzyl ammonium chloride. One example of an anionic wetting agent is the material identified by the term "Hiwet I PX" which is a water-soluble aryl alkyl sulphonate made by Federal Chemicals Pty. Ltd., of Melbourne, Australia; another example of an anionic wetting agent is the material identified by the term "Emcol P10–59" made by Witco Chemical Co., of New York, U.S.A., and which is an oil-soluble aryl alkyl sulphonate. An example of a non-ionic wetting agent is the material identified by the term "Emcol 5139" made by Witco Chemical Co., of New York, U.S.A.

The invention will be illustrated by the following practical examples, in which the term "sodium 2,4–D" means the sodium salt of 2,4-dichlorophenoxyacetic acid; the term "2,4–D" means 2,4-dichlorophenoxyacetic acid; the term "sodium 2,4,5–T" means the sodium salt of 2,4,5-trichlorophenoxyacetic acid; the term "2,4,5–T" means 2,4,5-trichlorophenoxyacetic acid; the term "sodium M.C.P.A." means the sodium salt of 2-methyl-4-chlorophenoxyacetic acid; and the term "M.C.P.A." means 2-methyl-4-chlorophenoxyacetic acid. The examples are as follow:

Example 1

| | G. |
|---|---|
| Sodium 2,4–D (calculated as 50% 2,4–D in reactor slurry) | 50 |
| Arquad 16/50 wetting agent | 1 |
| Cane sugar | 1 |
| Lighting kerosene | 7 |
| Slurry liquor and/or water to | 100 |

Example 2

| | |
|---|---|
| Sodium 2,4–D (calculated as 45% 2,4–D in reactor slurry) | 45 |
| Cetyl dimethyl benzyl ammonium chloride | 2 |
| Lighting kerosene | 9 |
| Slurry liquor and/or water to | 100 |

Example 3

| | |
|---|---|
| Sodium 2,4–D (calculated as 50% 2,4–D in reactor slurry) | 50 |
| Arquad 16/50 wetting agent | 2 |
| Solvent naphtha | 7 |
| Slurry liquor and/or water to | 100 |

Example 4

| | |
|---|---|
| Sodium 2,4,5–T (calculated as 50% 2,4,5–T in reactor slurry) | 50 |
| Arquad 16/50 wetting agent | 2 |
| Cane sugar | 1 |
| Power kerosene | 7 |
| Slurry liquor and/or water to | 100 |

Example 5

| | |
|---|---|
| Sodium 2,4,5–T (calculated as 40% 2,4,5–T in reactor slurry) | 40 |
| Arquad 16/50 wetting agent | 1 |
| Cane sugar | 1 |
| Lighting kerosene | 13 |
| Volclay bentonite | 1 |
| Slurry liquor and/or water to | 100 |

Example 6

| | |
|---|---|
| Sodium M.C.P.A. (calculated as 50% M.C.P.A. in reactor slurry) | 50 |
| Hiwet I PX wetting agent | 1.5 |
| Gum acacia | 1 |
| Solvent naphtha | 5 |
| Slurry liquor and/or water to | 100 |

Example 7

| | |
|---|---|
| Sodium M.C.P.A. (calculated as 50% M.C.P.A. in reactor slurry) | 50 |
| Emcol P10–59 wetting agent | 1 |
| Cane sugar | 1 |
| Lighting kerosene | 7 |
| Slurry liquor and/or water to | 100 |

Example 8

| | |
|---|---|
| Sodium M.C.P.A. (calculated as 50% M.C.P.A. in reactor slurry) | 50 |
| Emcol 5139 wetting agent | 1 |
| Lighting kerosene | 6 |
| Slurry liquor and/or water to | 100 |

Example 9

| | |
|---|---|
| Sodium M.C.P.A. (calculated as 40% M.C.P.A. in reactor slurry) | 40 |
| Arquad 16/50 wetting agent | 1 |
| Cane sugar | 1 |
| Lighting kerosene | 13 |
| Volclay bentonite | 1 |
| Slurry liquor and/or water to | 100 |

The proportions of the various components of the formulations may be changed to suit the desired consistency of the paste. Experiments which we have made indicate that the type of surface active agent to be employed may depend upon the impurities in the slurry of the herbicidal salt as obtained from the reactor. Thus, it has been found in the case of slurries of sodium 2,4-dichlorophenoxyacetate and sodium 2,4,5-trichlorophenoxyacetate that satisfactory pastes are prepared by using cationic surface active agents. On the other hand, it has been found that anionic and non-ionic surface active agents can be satisfactorily used with the sodium salt of 2-methyl-4-chlorophenoxyacetic acid. Formulations of the herbicidal salts in accordance with the invention may therefore have to be varied to suit the impurities content of the slurry.

The pastes of the invention are readily dispersible in water. A suitable method of dispersion is to add an approximately equal volume of water to the paste, stir thoroughly until the mixture is homogeneous and then pour the mixture into the required volume of dilution water. Although the described pastes containing from 40 to 80% by weight of the herbicidal salt are dispersible in water, the more concentrated pastes are somewhat more difficult to disperse than those containing less of this component. Pastes containing less than 60% w./w. of this component are to be preferred for this reason. The ease of dispersion and the viscosity of the paste will, of course vary somewhat according to the reactor charge and reaction conditions under which the herbicidal salt slurry is formed.

The paste compositions of the invention should have a consistency such as to be readily stirrable and preferably pourable. They conform with the definition of a paste, given in the textbook "Colloid Science," Alexander and Johnson, vol. 2, page 585, Oxford University Press, 1949, which describes pastes as being a concentrated dispersion (approximately greater than 10% by volume) of fine solid particles in a liquid continuum.

The embodiments of the invention in which an exclusive property or privilege is claimed are defined as follows:

1. A paste herbicide formulation comprising an aqueous suspension of solid particles of the salts of substituted phenoxycarboxylic acids having at least two substituents selected from the group consisting of chlorine atoms and the methyl radical, having from two to four carbon atoms in the carboxylic acid, said salts being selected from the group consisting of the alkali metal and amine salts; said suspension containing from 5 to 10% by weight hydrocarbon oil selected from the group consisting of kerosene and naphtha to provide a water impervious film around the said solid particles, and a surface active agent.

2. A paste herbicide formulation comprising an aqueous suspension of crystals of the alkali metal salts of acids of the structure

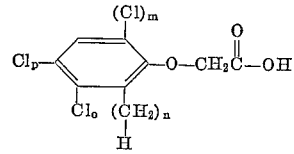

wherein $n$, $m$, $p$ and $q$ are each integers from zero to one provided that the sum of $m$, $n$, $p$ and $q$ is at least two, and further provided that when $n$ is one, $m$ and $q$ are each zero; said suspension having from one to two percent by weight of a surface active agent, from five to ten percent by weight of a hydrocarbon oil selected from the group consisting of kerosene and naphtha, and from 40 to 80 percent by weight of said salt.

3. A paste herbicide formulation comprising an aqueous suspension of 40 to 80 percent by weight of sodium 2,4-dichlorophenoxyacetate, from one to two percent of a surface active agent, and from five to ten percent of a hydrocarbon oil selected from the group consisting of kerosene and naphtha.

4. A paste herbicide formulation comprising an aqueous suspension of 40 to 80 percent by weight of sodium 2,4,5-trichlorophenoxyacetate, from one to two percent of a surface active agent, and from five to ten percent of a hydrocarbon oil selected from the group consisting of kerosene and naphtha.

5. A paste herbicide formulation comprising an aqueous suspension of 40 to 80 percent by weight of sodium 2-methyl-4-chlorophenoxyacetate, from one to two percent of a surface active agent, and from five to ten percent of a hydrocarbon oil.

References Cited in the file of this patent

UNITED STATES PATENTS

| | | |
|---|---|---|
| 2,394,916 | Jones | Feb. 12, 1946 |
| 2,558,762 | Kohr | July 3, 1951 |
| 2,726,150 | Wolter | Dec. 6, 1955 |
| 2,867,519 | Bartlett | Jan. 6, 1959 |

FOREIGN PATENTS

| | | |
|---|---|---|
| 815,510 | Great Britain | June 24, 1959 |

UNITED STATES PATENT OFFICE
CERTIFICATE OF CORRECTION

May 26, 1964

Patent No. 3,134,664

David Edward Baum et al.

It is hereby certified that error appears in the above numbered patent requiring correction and that the said Letters Patent should read as corrected below.

Column 6, lines 7 to 11, for the lower left-hand portion of the structural formula reading $$\overset{|}{Cl_o} \quad \text{read} \quad \overset{|}{Cl_q}$$

same column 6, line 38, after "oil" and before the period, insert -- selected from the group consisting of kerosene and naphtha --.

Signed and sealed this 13th day of October 1964.

(SEAL)
Attest:

ERNEST W. SWIDER
Attesting Officer

EDWARD J. BRENNER
Commissioner of Patents